United States Patent [19]

Palau

[11] Patent Number: 4,474,220
[45] Date of Patent: Oct. 2, 1984

[54] MECHANISMS FOR DRIVING REGULATORS IN WEAVING LOOMS

[75] Inventor: Joseph Palau, Saint Jorioz, France

[73] Assignee: S.A. des Etablissements Staubli, Faverges, France

[21] Appl. No.: 461,100

[22] Filed: Jan. 25, 1983

[30] Foreign Application Priority Data

Jan. 29, 1982 [FR] France .............................. 82 01755

[51] Int. Cl.³ ........................................... D03D 51/08
[52] U.S. Cl. .................................. 139/1 E; 139/66 R; 139/336
[58] Field of Search ............. 139/1 E, 1 R, 336, 66 R, 139/304, 313

[56] References Cited

U.S. PATENT DOCUMENTS

| 2,013,535 | 9/1935 | Camps ................................... 139/313 |
| 3,934,620 | 1/1976 | Garcia ................................. 139/304 X |

FOREIGN PATENT DOCUMENTS

| 48-3667 | 2/1973 | Japan ................................... 139/1 E |
| 489644 | 6/1970 | Switzerland ........................ 139/1 E |
| 502538 | 3/1939 | United Kingdom ................ 139/336 |
| 582339 | 11/1946 | United Kingdom ................ 139/1 E |

*Primary Examiner*—James Kee Chi
*Attorney, Agent, or Firm*—Dowell & Dowell

[57] ABSTRACT

The invention relates to improvements in mechanisms for driving regulators of weaving looms. Between the shaft of the dobby and the chain pinion which drives the regulator of the loom there is interposed a differential reverser whose satellites are borne by a race axially moveable coil. The latter is moveable through the unweaving circuit so that the reverser is automatically actuated during unweaving and causes the regulator and the woven fabric to move backwards while the dobby continues to rotate in the same direction (electronic program).

4 Claims, 4 Drawing Figures

MECHANISMS FOR DRIVING REGULATORS IN WEAVING LOOMS

The present invention relates to devices which are known in the textile industry under the name of "regulators" and which are adapted to advance the fabric in weaving looms.

As illustrated very schematically in FIG. 1 of the accompanying drawings, it is known that, in a conventional weaving loom, the layer 1 formed by the warp yarns is unwound from a drum or beam 2 in order to be subjected to the action of heddle frames 3 controlled vertically by a dobby or other weaving system 4. These frames 3 effect cross-opening of the warp yarns with a view to successively inserting the weft yarns, which are pushed tightly against one another by an oscillating reed or batten 5. The fabric 1' thus formed is drawn longitudinally by a regulator 6 disposed immediately upstream of a receiver drum 7; this regulator 6 generally comprises guide drums provided on either side of a drive roller 6' provided on its periphery with radial needles which penetrate in the fabric 1' in order to ensure displacement thereof.

Finally, it is understood that it is the speed of rotation of this regulator 6 which to some extent determines the speed of linear displacement of the fabric in the loom. This speed obviously varies as a function of the number of weft yarns to be inserted in the fabric over a given length, depending on the nature of the fabric to be made, so that the drive roller 6' with needles is usually driven via a speed variator 8. The variator 8 is well known in the art, typically comprising a variable speed pulley drive as shown in U.S. Pat. No. 3,934,620 to Garcia as shown at 5 in FIG. 6, or at 17 in FIG. 4, and described in the patent as being "conventional", see column 1, line 67. This variator controls the rotation rate of Garcia's regulator, which is described in his specification, column 2, line 19, as "drawing roller 21". To ensure drive of this variator 8, a shaft of the loom may of course be employed, but it has been observed that it is advantageous, at least in looms in which the system 4 is constituted by a dobby, to use as the power take-off the shaft of said dobby so that the synchronism between dobby and regulator is perfect.

Such synchronism is particularly advantageous when it is desired to proceed with an unweaving operation following a weaving defect. In such a case, the loom and the dobby are momentarily disconnected from each other so that the dobby can be driven independently of the loom and be returned into synchronism with the weaving programme. Since it is necessary to move the fabric backwards, it will be readily appreciated that the connection between dobby and regulator simplifies matters since the rotation of the dobby in reverse motion automatically achieves rearward displacement of the fabric.

It has recently been proposed to replace the "mechanical" programmes (wheels or chains incorporating pins, punched paper, cards, etc . . .) of the dobbies by so-called "electronic" programmes. The control sequence of the different members of the dobby is then given by a series of electronic circuits, introduced into the dobby in easily replaceable manner, so that the above-mentioned members move in a determined manner. It is appreciated that, contrary to a mechanical programme which must be displaced in the same direction as the dobby itself, such an electronic programme may be advanced or moved back without difficulty, without it being necessary to change the direction of rotation of the dobby. However, this possibility has not been exploited up to the present time on the grounds that, the drive of the regulator being connected to that of the dobby, it is impossible to move the fabric back with the aid of the regulator during unweaving if the direction of rotation of the dobby is not itself reversed.

It is an object of the present invention to overcome this drawback, essentially by introducing into the kinematic chain connecting the shaft of the dobby to the member for actuating movement of the regulator, a direction-of-rotation reverser which is actuated when the dobby is controlled for unweaving.

According to a preferred embodiment of the foregoing arrangement, a differential reverser is employed, comprising a satellite holder carrying at least one satellite pinion which meshes simultaneously with two toothed gear wheels respectively fixed to the shaft of the dobby and the member for actuating movement of the regulator, the angular immobilisation of the satellite-holder being achieved under the control of a coil connected to the circuit of the dobby and operative during unweaving.

The invention will be more readily understood on reading the following description with reference to the accompanying drawings, in which:

FIG. 1, as indicated hereinbefore, is a schematic diagram illustrating the arrangement of a weaving loom equipped with a regulator driven from the dobby.

Figure 2:
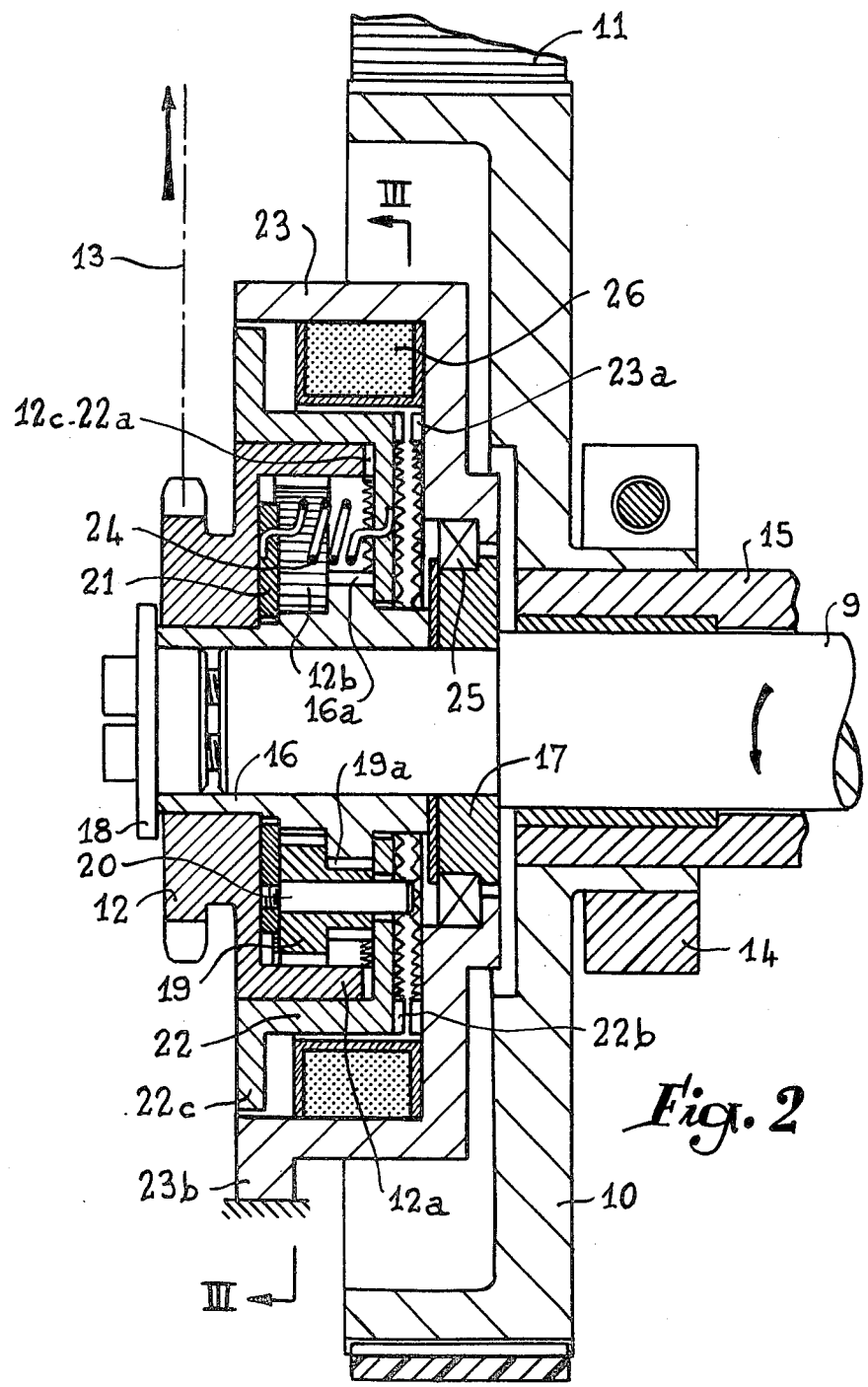
FIG. 2 is an axial section through a mechanism according to the invention for driving the regulator, which mechanism has been assumed to be directly mounted on the shaft of the dobby.
Figure 4:
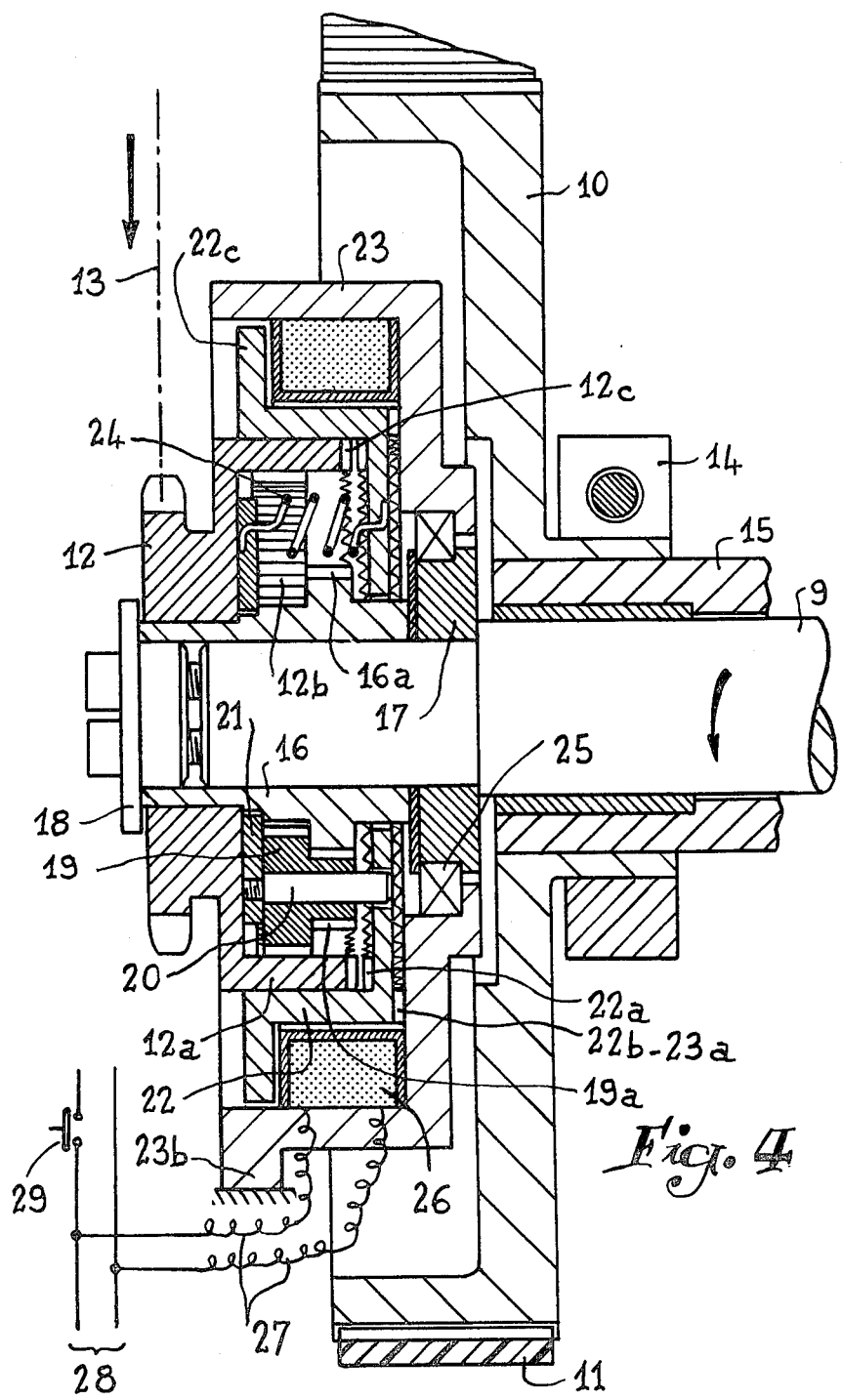

FIG. 4 reproduces FIG. 2 in another position of the satellite holder; this Figure indicates the electrical supply diagram for the coil of the mechanism.

Figure 1:
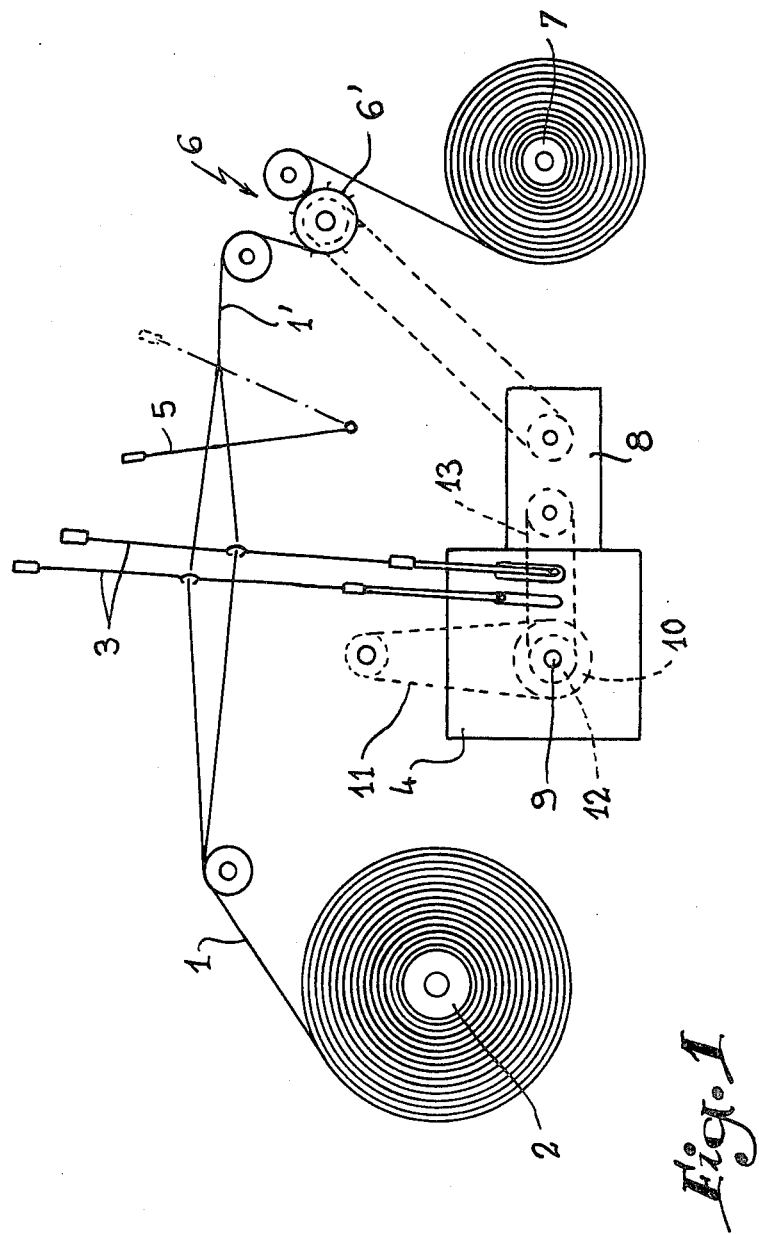
Figure 3:
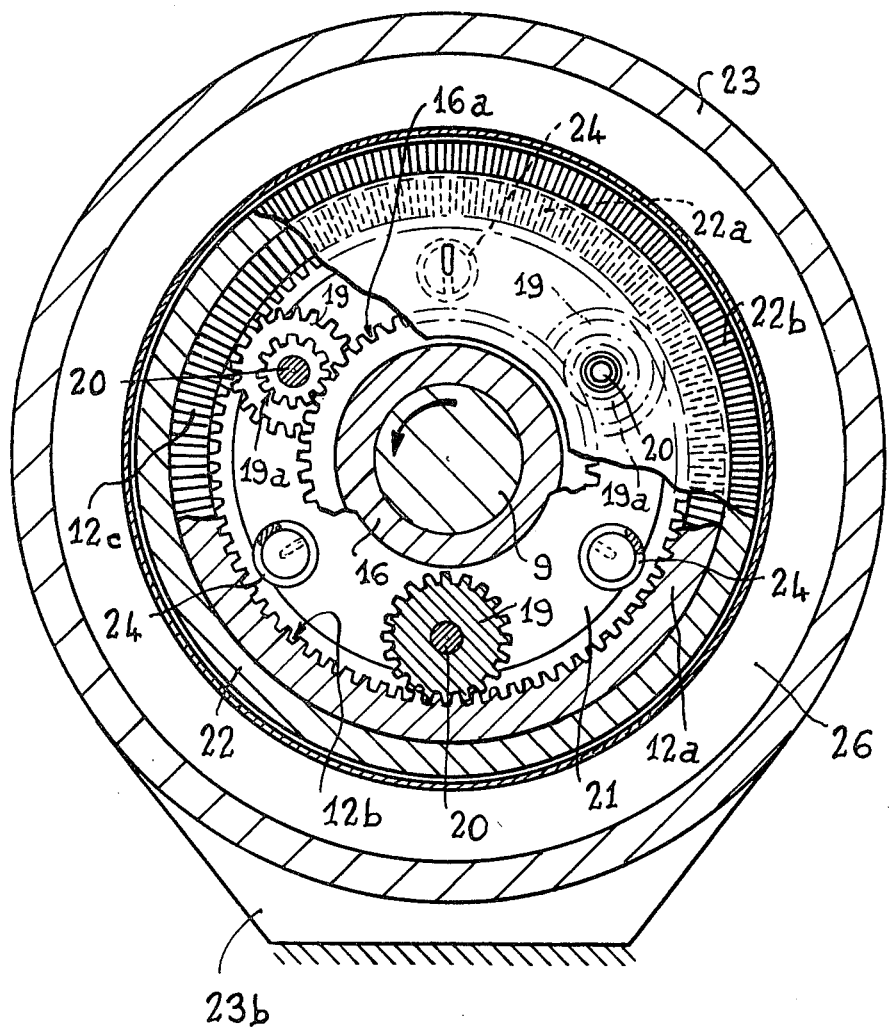
FIG. 3 is a transverse section along the plane indicated at III—III in FIG. 2.

Referring now to the drawings, in FIGS. 1 to 3, reference 9 denotes the end of the shaft of the dobby which projects out of the casing of the latter. This shaft 9 is driven, in manner known per se, by a pulley 10 connected by a notched belt 11 to a shaft of the weaving loom. It is against the hub of this pulley 10 that the chain wheel 12 of the drive mechanism of the regulator 6 is housed, said wheel 12 being connected by a chain 13 to the inlet of the variator 8. The pulley 10 is rendered axially fast, by means of a clamp 14, with a tubular shaft 15 which encompasses the afore-mentioned shaft 9, the angular connection between the two coaxial shafts 9 and 15 being effected by the members of the dobby as a function of the programme thereof or by those of the shed locating device in the case of unweaving.

As shown in FIG. 2, the chain wheel 12 is mounted idly on a bush 16 which is blocked on the shaft 9 between an inner annular stop 17 and a terminal cap 18, which simultaneously holds the said wheel 12 axially. The hub of this wheel 12 is fast with a rear part 12a in the form of a cylindrical dish, provided on its inner wall with a toothing 12b. The latter cooperates with satellite pinions 19 (FIG. 3), three in number in the embodiment envisaged, mounted idly on small shafts 20 fixed in overhang on a support disc 21 comprising the satellite holder. It will be observed that the latter swivels freely on the bush 16, but that, on the contrary, this bush comprises a toothing 16a which meshes with a lateral toothing 19a of each satellite 19.

On the periphery of the dish 12a is mounted for axial sliding a race 22 provided with two opposite front toothings 22a and 22b. The toothing 22a faces a front toothing 12c (FIG. 4) formed at the end of the dish 12a, whilst toothing 22b, facing in the direction of the hub of pulley 10, is adapted to cooperate with a corresponding toothing 23a provided in a fixed bell element or casing 23 which will be described hereinafter. It should be noted that the race 22 is returned forwardly (leftwardly) by springs 24 disposed between the pinions 19 and whose ends are attached on the one hand to said race, on the other hand to the disc 21, which is axially stopped by an annular shoulder of the bush 16; these springs 24 consequently tend to maintain the toothings 22a and 12c in mesh.

The bell element 23 is mounted on the annular stop 17 via a bearing 25 and it is maintained angularly and axially immobile by any appropriate fixing means, shown schematically in FIG. 3 in the form of a lateral blocking lug 23b. In the annular space made between the edge of this bell element 23 and the outer wall of the race 22 is housed a coil 26 which is adapted, when it is energized, to exert an effect of attraction on the annular edge 22c of the race 22, against the action of springs 24. When this race 22 is thus displaced leftwardly axially, the toothings 22a and 12c come into mesh, whilst the toothings 22b and 23a are engaged from each other, as will be more readily understood by comparing FIGS. 2 and 4.

Coil 26 is connected, through conductors schematically shown at 27 in FIG. 4, to the electronic circuit 28 which is controlled, for example by a switch 29, with a view to actuating the dobby 4 for unweaving, so that said coil is supplied at the same time as the said circuit 28.

The operation and mode of using the drive device described hereinabove will be readily understood.

When the loom-dobby assembly functions normally, i.e. during weaving, the coil 26 is not supplied, so that the parts are in the position illustrated in FIG. 2. As a result of the mutual engagement of the toothings 12c and 22a under the effect of the springs 24, the race 22, which rotates with the satellite-holder, is free to rotate with the dish 12a and the chain wheel 12, so that the rotation of the shaft 9 and of toothing 16a causes rotation of the said dish connected to said toothing by the pinions 19. The latter orbit around with the dish and race, but do not rotate about their own shafts 20 so that they do not determine any reversal of the direction of rotation. The chain wheel 12 rotates in the same direction as shaft 9.

When, on the other hand, the dobby and/or the shed locating device which is associated therewith are controlled for unweaving by closing the switch 29 of FIG. 4, the circuit 28 is supplied at the same time as the coil 26; the latter attracts race 22 and the effect of its axial displacement is to disconnect the toothings 12c and 22a and to engage, on the other hand, the toothings 22b and 23a. The race 22 is consequently angularly immobilized by the fixed bell element 23, so that, taking into account the rotation of the toothing 16a, the satellite pinions 10 are obliged to rotate on their own shafts 20 to drive the dish 12a and the chain wheel 12. This rotation of the satellites obviously introduces a reversal of the direction of rotation, i.e. the chain pinion 12 rotates in the opposite direction to shaft 9, so that the regulator 6 is itself driven in reverse motion and causes the fabric 1' to move backwards.

It will be readily appreciated that the whole of the drive mechanism with automatic reversal of the direction of rotation may be mounted, not directly on the shaft 9 of the dobby, but on the driving or driven shaft of the speed variator 8 or on the regulator 6 itself. Reversing devices other than the one incorporating satellite pinions, as mentioned above, may also be envisaged.

It must, moreover, be understood that the foregoing description has been given only by way of non-limiting example and that it in no way limits the domain of the invention; replacement of the details of execution described by any other equivalents will not depart from the scope thereof.

What is claimed is:

1. In a fabric weaving loom having means for driving the shaft of a dobby and having a regulator roller receiving the woven fabric, a reverser mechanism for coupling drive from the dobby shaft to drive the regulator roller selectively in either direction, comprising:
   (a) a drive wheel carried by the reverser mechanism and coupled to drive said regulator roller;
   (b) gear drive means coupled to be driven by the dobby shaft, and comprising forward drive means normally operative to drive the drive wheel forwardly with respect to the rotation of the dobby shaft and comprising reverse drive means selectively operable to drive the drive wheel in a reverse direction with respect to the rotation of the dobby shaft; and
   (c) means operable when the dobby is controlled for unweaving to select the reverse drive means.

2. A reverser mechanism as claimed in claim 1, wherein said gear drive means comprises first and second gear wheels coupled, respectively, with the dobby shaft and with said drive wheel; satellite holder means carrying satellite pinions meshing with both gear wheels; and said means for selecting the reverse drive means including means for rendering the satellite holder stationary, whereby drive from the first to the second gear wheel is reversed through the satellite pinions.

3. A reverser mechanism as claimed in claim 2, wherein said first and second gear wheels are concentrically carried with respect to the dobby shaft; wherein the satellite holder comprises a race member having a radially disposed portion having teeth on opposite faces, the race member being axially slidable with respect to the shaft and second gear wheel and carrying said satellite pinions; the second gear wheel having a radially diposed surface carrying teeth; and the mechanism having a fixed radially disposed surface carrying teeth; and said means for selecting comprising means normally axially positioning the race member to engage the teeth of one of its faces with said second gear wheel surface teeth, and comprising means selectively operable to axially position the race member to engage the teeth on the other of its faces with said fixed surface teeth.

4. A reverser mechanism as claimed in claim 1, for use in a loom having electrical circuit means to control the dobby for unweaving, wherein said means for selecting the reverse drive means comprises electromagnetic means connected to said electrical circuit means and energized thereby during unweaving.

* * * * *